United States Patent
Park et al.

(10) Patent No.: US 10,887,850 B2
(45) Date of Patent: *Jan. 5, 2021

(54) UPLINK POWER HEADROOM REPORT

(71) Applicant: QUALCOMM INCORPORATED, San Diego, CA (US)

(72) Inventors: Seyong Park, San Diego, CA (US); Amir Aminzadeh Gohari, Sunnyvale, CA (US); Renqiu Wang, San Diego, CA (US); Yi Huang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,450

(22) Filed: Sep. 16, 2019

(65) Prior Publication Data

US 2020/0053666 A1 Feb. 13, 2020

Related U.S. Application Data

(63) Continuation of application No. 15/839,074, filed on Dec. 12, 2017, now Pat. No. 10,420,044.

(Continued)

(51) Int. Cl.
*H04W 52/36* (2009.01)
*H04W 52/14* (2009.01)
(Continued)

(52) U.S. Cl.
CPC ....... *H04W 52/365* (2013.01); *H04W 52/146* (2013.01); *H04W 52/346* (2013.01);
(Continued)

(58) Field of Classification Search
None
See application file for complete search history.

(56) References Cited

U.S. PATENT DOCUMENTS

| 9,220,107 B2 | 12/2015 | Loehr et al. |
| 9,357,421 B2 | 5/2016 | Hwang et al. |

(Continued)

FOREIGN PATENT DOCUMENTS

| CN | 106465300 A | 2/2017 |
| WO | 2015116757 A1 | 8/2015 |
| WO | 2016137816 A2 | 9/2016 |

OTHER PUBLICATIONS

International Search Report and Written Opinion—PCT/US2018/017851—ISA/EPO—dated May 17, 2018.
Taiwan Search Report—TW107107402—TIPO—dated Feb. 17, 2020.

*Primary Examiner* — Mohammed Rachedine
(74) *Attorney, Agent, or Firm* — Haynes and Boone, LLP

(57) ABSTRACT

Wireless communications systems and methods related to improve control reporting latency are provided. A wireless communication device receives, from a first link in a first time interval, first control information associated with a second link and the first time interval. The wireless communication device transmits, via the second link in the first time interval, a control report associated with the second link based on a report configuration that is independent from the first control information. The report configuration is associated with a waveform type. The wireless communication device receives, from the first link in a second time interval following the first time interval, second control information that is dependent on the control report. The report configuration includes a power headroom (PHR) report configuration. The PHR report configuration includes a reference PHR report configuration. The PHR report configuration includes a delayed PHR report configuration.

20 Claims, 9 Drawing Sheets

Related U.S. Application Data

(60) Provisional application No. 62/470,085, filed on Mar. 10, 2017.

(51) Int. Cl.
| | |
|---|---|
| *H04W 72/12* | (2009.01) |
| *H04W 52/34* | (2009.01) |
| *H04W 52/26* | (2009.01) |
| *H04W 24/10* | (2009.01) |
| *H04W 72/04* | (2009.01) |
| *H04L 5/00* | (2006.01) |

(52) U.S. Cl.
CPC ......... *H04W 72/1268* (2013.01); *H04L 5/005* (2013.01); *H04L 5/0048* (2013.01); *H04W 24/10* (2013.01); *H04W 52/262* (2013.01); *H04W 72/0473* (2013.01)

(56) References Cited

U.S. PATENT DOCUMENTS

| | | | |
|---|---|---|---|
| 10,085,265 | B2 | 9/2018 | Vajapeyam et al. |
| 2013/0064131 | A1* | 3/2013 | Kwon ................... H04L 5/0007 370/252 |
| 2013/0070611 | A1 | 3/2013 | Ahn et al. |
| 2015/0098424 | A1* | 4/2015 | Li .......................... H04W 72/04 370/329 |
| 2015/0282104 | A1* | 10/2015 | Damnjanovic ... H04W 72/0446 455/522 |
| 2015/0350944 | A1 | 12/2015 | Chen et al. |
| 2016/0037463 | A1 | 2/2016 | Siomina et al. |
| 2016/0242128 | A1 | 8/2016 | Loehr et al. |
| 2016/0255594 | A1 | 9/2016 | Vajapeyam et al. |
| 2016/0323887 | A1 | 11/2016 | Patel et al. |
| 2016/0330698 | A1 | 11/2016 | Loehr et al. |
| 2017/0019864 | A1* | 1/2017 | Hwang ................ H04W 52/34 |
| 2018/0262998 | A1 | 9/2018 | Park et al. |

\* cited by examiner

UPLINK POWER HEADROOM REPORT

CROSS REFERENCE TO RELATED APPLICATIONS

The present application is a continuation application of U.S. Non-Provisional patent application Ser. No. 15/839,074 filed Dec. 12, 2017, which claims priority to and the benefit of the U.S. Provisional Patent Application No. 62/470,085, filed Mar. 10, 2017, the disclosure of each of which is hereby incorporated by reference in its entirety

TECHNICAL FIELD

The technology discussed in this disclosure relates generally to wireless communication systems, and more particularly to improving power headroom (PHR) reporting latency. Certain embodiments can enable and provide improved communication techniques allowing user equipment devices (UEs) to generate and transmit PHR reports to base stations for uplink power control and can be utilized in scenarios where low latency may be desired for communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

A wireless multiple-access communications system may include a number of base stations (BSs), each simultaneously supporting communication for multiple communication devices, which may be otherwise known as user equipment (UE). Each UE can communicate with one or more BSs via transmissions on forward and reverse links. The forward link or downlink (DL) refers to the communication link from BSs to UEs, and the reverse link or uplink (UL) refers to the communication link from UEs to BSs.

With many UEs transmitting signals in proximity, power control is important for yielding sufficient signal-to-noise ratios (SNRs) at different data rates and transmission bandwidths for communications over the UL. For example, UEs can report transmit power information to BSs to enable the BSs to schedule according to the transmit power information. Accordingly, improved procedures for UEs to report transmit power information may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for reducing control report latency. A user equipment (UE) may report PHR based on a report configuration received from a base station (BS). The report configuration may include a reference PHR report configuration indicating at least a predetermined waveform type. Alternatively, the report configuration may indicate a delayed PHR report configuration, in which a UE may report a delayed PHR based on scheduling information received for a previous frame.

For example, in an aspect of the disclosure, a method of wireless communication includes receiving, by a wireless communication device from a first link in a first time interval, first control information associated with a second link and the first time interval; transmitting, by the wireless communication device via the second link in the first time interval, a control report associated with the second link based on a report configuration that is independent from the first control information; and receiving, by the wireless communication device from the first link in a second time interval following the first time interval, second control information that is dependent on the control report.

In an additional aspect of the disclosure, a method of wireless communication includes transmitting, by a wireless communication device via a first link in a first time interval, first control information associated with a second link and the first time interval; receiving, by the wireless communication device via the second link in the first time interval, a control report associated with the second link based on a report configuration that is independent from the first control information, the report configuration associated with a waveform type; and transmitting, by the wireless communication device via the first link in a second time interval following the first time interval, second control information that is dependent on the control report.

In an additional aspect of the disclosure, an apparatus includes a transceiver configured to receive, from a first link in a first time interval, first control information associated with a second link and the first time interval; transmit, via the second link in the first time interval, a control report associated with the second link based on a report configuration that is independent from the first control information, the report configuration associated with a waveform type; and receive, from the first link in a second time interval following the first time interval, second control information that is dependent on the control report.

In an additional aspect of the disclosure, an apparatus includes a transceiver configured to transmit, via a first link in a first time interval, first control information associated with a second link and the first time interval; receive, via the second link in the first time interval, a control report associated with the second link based on a report configuration that is independent from the first control information, the report configuration associated with a waveform type; and transmit, via the first link in a second time interval following the first time interval, second control information that is dependent on the control report.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
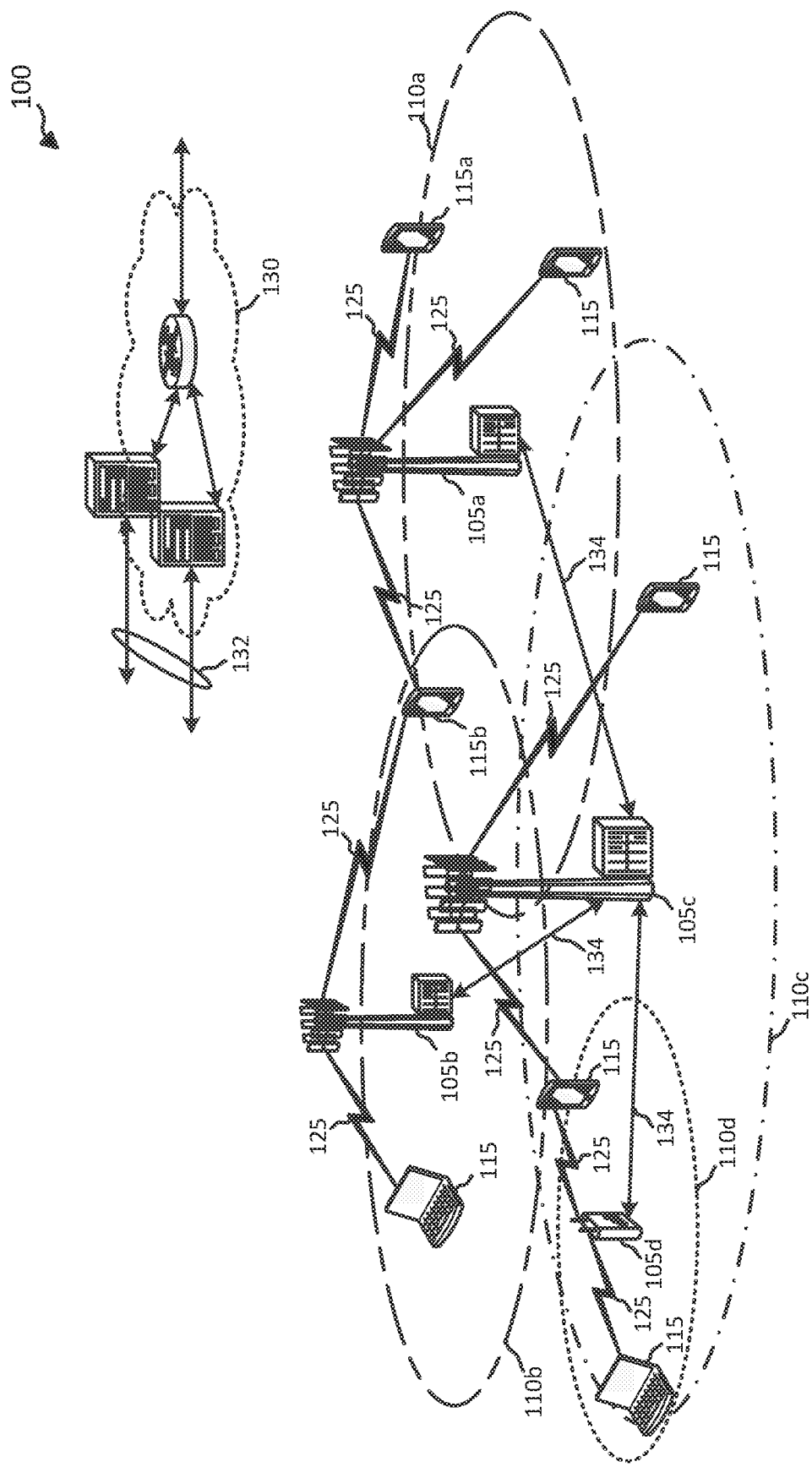
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The present disclosure describes mechanisms and techniques aimed at improving communication latency (e.g., control report latency). For example, a BS may schedule a UE to transmit in an uplink (UL) direction during a subframe by assigning resources, a modulation coding scheme (MCS), and/or a waveform type for the UE. The scheduling information may be transmitted in a DL control portion of a low-latency subframe. The UE may report a transmit power headroom (PHR) to facilitate UL power control. The PHR report may be transmitted in a long UL burst portion of the low-latency subframe.

According to some embodiments, the UE reports PHR based on a reference PHR report configuration. The reference PHR report configuration may indicate a predetermined number of RBs, a predetermined MCS, and/or a predetermined waveform type. For reference-based reporting, the UE computes the PHR based on the predetermined number of RBs, the predetermined MCS, and/or the predetermined waveform type. In such an embodiment, the BS may determine scheduling information for a next subframe based on the received PHR report and the reference PHR report configuration.

In another embodiment, the UE reports PHR based on a delayed PHR report configuration. For delayed reporting, the UE computes the PHR based on scheduling information (e.g., assigned number of RBs, MCS, and/or waveform type) received in a previous subframe and transmits the PHR report in a current subframe. In such an embodiment, the BS may determine scheduling information for a next subframe based on the received PHR report and the previous scheduling information. While the disclosed embodiments are described in the context of PHR computation and reporting, the disclosed embodiments can be applied to any UL control reporting that is based on DL control information or any DL control reporting that is based on UL control information. In addition, according to some aspects, PHR reports described herein can be uncoupled from being time-critical dependent on control information (e.g., downlink control information received in a current subframe).

FIG. 1 illustrates a wireless communication network 100 according to some embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, an entertainment device, medical device, industrial equipment, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, actuator/sensors, or the like. UEs may be shaped and sized in various manners and include an external housing configured to carry a number of internal components (such as circuits/processors for implementation of the various described innovations).

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication. Self-contained subframes are described in greater detail herein.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

Figure 2:
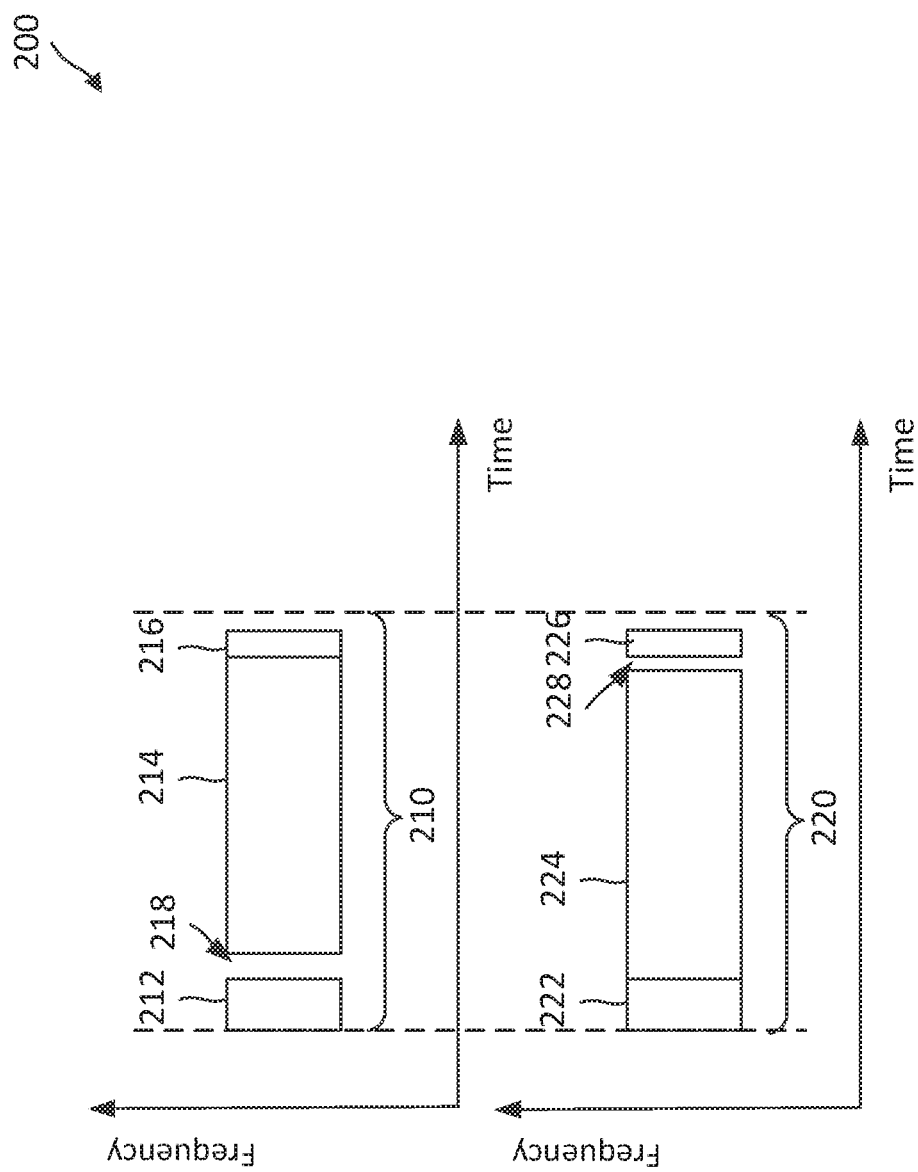
FIG. 2 illustrates a low-latency subframe configuration according to some embodiments of the present disclosure.

FIG. 2 illustrates a low-latency subframe configuration 200 according to some embodiments of the present disclosure. The configuration 200 may be employed by the BSs 105 and the UEs 115 for transmission. In FIG. 2, the x-axis represents time in some constant units and the y-axis represents frequency in some constant units. The configuration 200 shows two self-contained subframes 210 and 220. The subframes 210 and 220 can be configured for UL transmission and/or DL transmission.

The subframe 210 may be referred to as a UL-centric subframe. The subframe 210 includes a DL control portion 212 for carrying DL control, a long UL burst portion 214 for carrying UL data and/or UL control, and a short UL burst portion 216 for carrying UL data and/or UL control. The subframe 220 may be referred to as a DL-centric subframe. The subframe 220 includes a DL control portion 222 for carrying DL control, a DL burst portion 224 for carrying DL data, and a short UL burst portion 226 for carrying UL data and/or UL control.

In the context of LTE, the DL control portions 212 and 222 may carry signals for a physical downlink control channel (PDCCH). The DL burst portion 224 may carry signals for a physical downlink shared data channel (PDSCH). The long UL burst portion 214 and the short UL burst portions 216 and 226 may carry signals for a physical uplink shared data channel (PDSCH) and/or a physical uplink control channel (PUCCH).

The subframe 210 further includes a guard interval 218 between the DL control portion 212 and the long UL burst portion 214. The subframe 220 further includes s a guard interval 228 between the DL burst portion 224 and the short UL burst portion 226. The guard intervals 218 and 228 allow for switching between transmit and receive. The self-contained subframes 210 and 220 may have a short duration, for example, about 0.25 milliseconds (ms). The inclusion of both UL and DL portions within a subframe can improve latency and allow for fast feedback.

Figure 3:
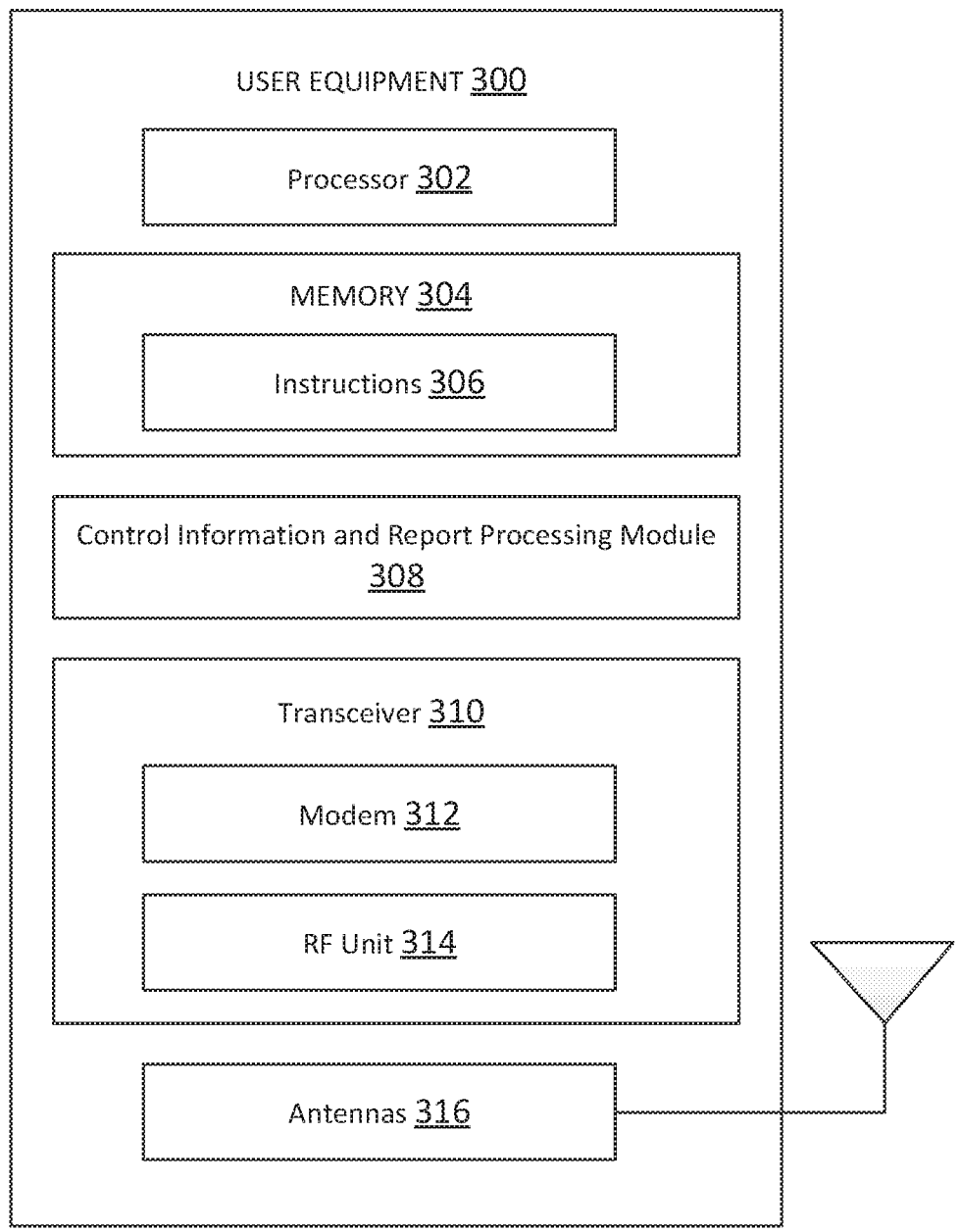
FIG. 3 is a block diagram of an exemplary user equipment (UE) according to some embodiments of the present disclosure.

FIG. 3 is a block diagram of an exemplary UE 300 according to some embodiments of the present disclosure. The UE 300 may be a UE 115 as discussed above. As shown, the UE 300 may include a processor 302, a memory 304, a control information and report processing module 308, a transceiver 310 including a modem subsystem 312 and a radio frequency (RF) unit 314, and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The control information and report processing module 308 may be implemented via hardware, software, or combinations thereof. For example, the control information and report processing module 308 may be implemented as a processor, circuit, and/or instructions 306 stored in the memory 304 and executed by the processor 302. The control information and report processing module 308 may be used for various aspects of the present disclosure. For example, the control information and report processing module 308 is configured to determine UL power headroom based on UL configurations (e.g., resource, MCS, waveform type, and/or maximum transmit power of the UE 300), perform UL power control, and report power headroom information, as described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the control information and report processing module 308 according to an MCS, e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of control reports according to embodiments of the present disclosure. The antenna 316 may further receive data messages transmitted from other devices. This may include, for example, reception of DL control information according to embodiments of the present disclosure. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links. The RF unit 314 may configure the antenna 316.

Figure 4:
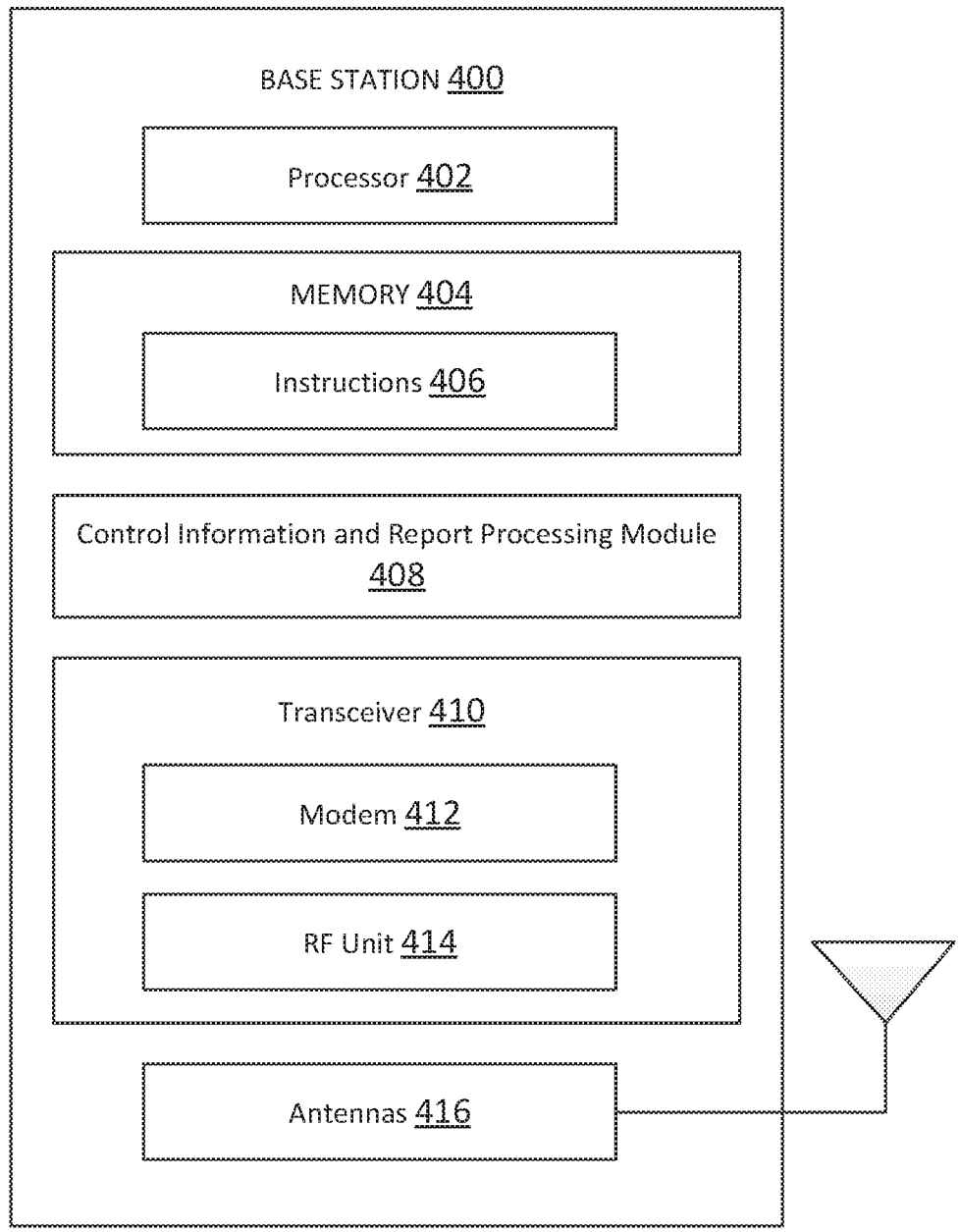
FIG. 4 is a block diagram of an exemplary base station (BS) according to some embodiments of the present disclosure.

FIG. 4 is a block diagram of an exemplary BS 400 according to some embodiments of the present disclosure. The BS 400 may be a BS 105 as discussed above. A shown, the BS 400 may include a processor 402, a memory 404, a control information and report processing module 408, a transceiver 410 including a modem subsystem 412 and a RF unit 414, and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The control information and report processing module 408 may be implemented via hardware, software, or combinations thereof. For example, the control information and report processing module 408 may be implemented as a processor, circuit, and/or instructions 406 stored in the memory 404 and executed by the processor 402. The control information and report processing module 408 may be used for various aspects of the present disclosure. For example, the control information and report processing module 408 is configured to receive UL PHR, determine UL scheduling (e.g., resource allocation, MCS assignment, and waveform type configuration) based on the received UL PHR, and transmit UL scheduling configuration, as described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of information to complete attachment to a network and communication with a camped UE 115 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
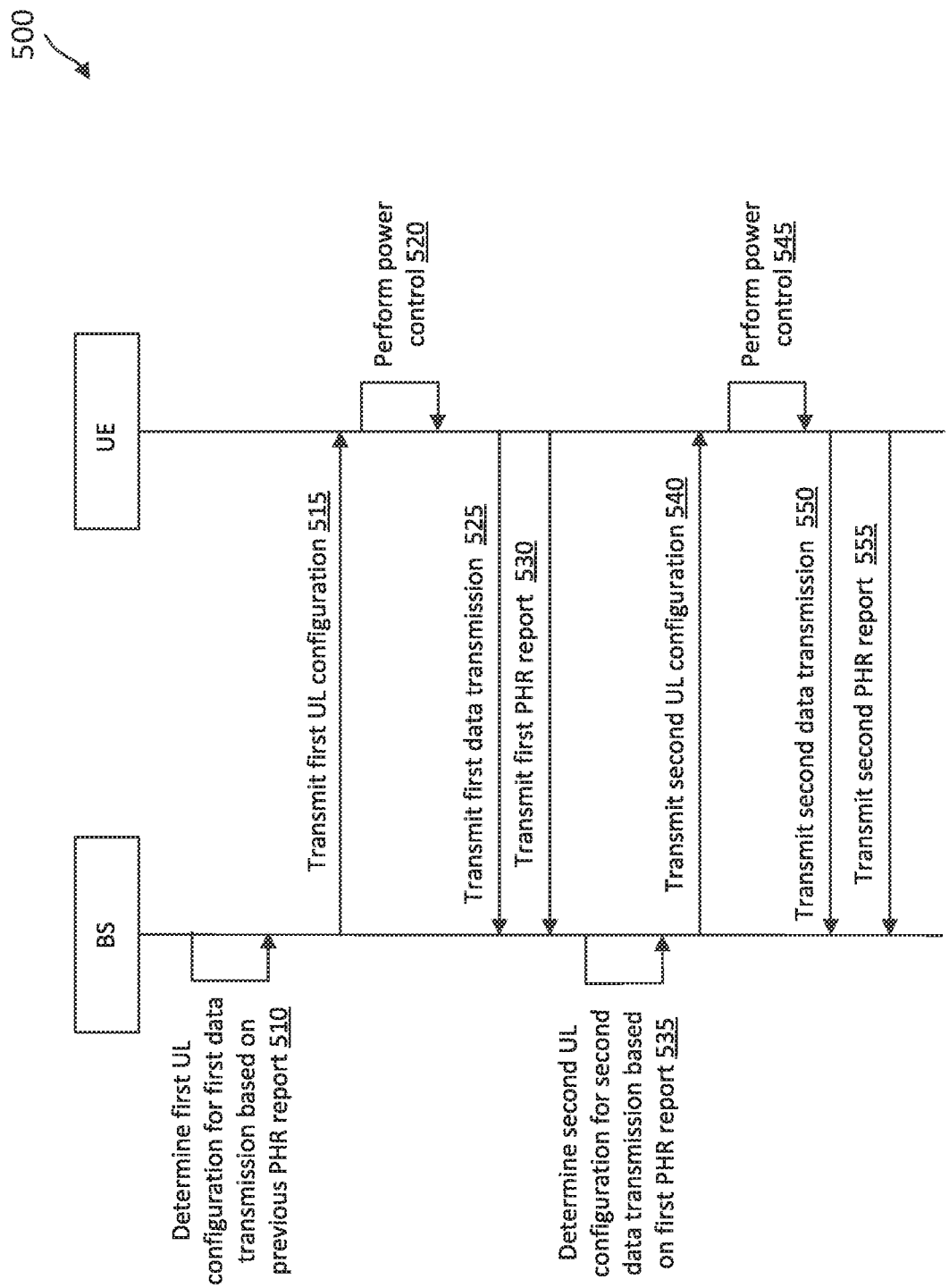
FIG. 5 is a signaling diagram of a closed-loop uplink (UL) power control method according to some embodiments of the present disclosure.

FIG. 5 is a signaling diagram of a closed-loop UL power control method 500 according to some embodiments of the present disclosure. The method 500 is implemented between a BS similar to the BSs 105 and a UE similar to the UEs 115. Steps of the method 500 can be executed by computing devices (e.g., a processor, processing circuit, and/or other suitable component) of the BS and the UE. As illustrated, the method 500 includes a number of enumerated steps, but embodiments of the method 500 may include additional steps before, after, and in between the enumerated steps. In some embodiments, one or more of the enumerated steps may be omitted or performed in a different order.

At step 510, the BS schedules the UE for a first data transmission and determines a first UL configuration for the first data transmission based on a previous PHR report received from the UE. The details of PHR reports are described more fully below. The first UL configuration may include a number of resource blocks (RBs), an MCS, and/or a waveform type assigned for the first data transmission. A RB may include a group of frequency subcarriers. An MCS may indicate a modulation method and a transport block size, which together determines a data rate. Example modulation methods may include quadrature phase-shift keying (QPSK), 16-quadrature amplitude modulation (16-QAM), 64-quadrature amplitude modulation (64-QAM), and 256-quadrature amplitude modulation (256-QAM). Example waveform types may include OFDM waveform type and discrete Fourier transform spread OFDM (DFT-s-OFDM) waveform type. An OFDM waveform may have a higher peak-average-ratio (PAR) than DFT-s-OFDM waveform.

At step 515, the BS transmits the first UL configuration to the UE, for example, in the format of a DL control information (DCI) block.

At step 520, the UE performs power control based on the first UL configuration. For example, the UE may compute a first transmit power, denoted as $P_{PUSCH}$, for the first data transmission as shown below:

$$P_{PUSCH} = \min[P_{cmax}, 10 \times \log(M_{PUSCH}(i)) + P_{O\_PUSCH}(i) + [PL \times \alpha(i)] + \Delta_{TF(i)} + f(i)] \quad (1)$$

where $P_{cmax}$ represents the maximum transmit power configured for the UE, for example, according to a particular communication standard. $P_{O\_PUSCH}$ represents the target power spectral density. $M_{PUSCH}$ represents the number of assigned RBs in the first UL configuration. PL represents the estimated DL path loss. α represents the factor to enable or disable fractional power control or cell specific factor. $f(i)$ represents the closed loop component of the power control, for example, received from a transmission power control (TPC) command. $\Delta_{TF}$ represents a transport format-dependent compensation factor determined based on the MCS in the first UL configuration.

After computing the first transmit power, the UE computes a first PHR as shown below:

$$PHR = P_{CMAX} - P_{PUSCH} \quad (2)$$

The PHR indicates an amount of remaining transmission power that the UE may use in addition to the first transmit power.

At step 525, the UE transmits the first data transmission based on the first transmit power $P_{PUSCH}$ computed in equation (1). At step 530, the UE transmits a first PHR report indicating the first PHR, for example, in the format of a UL control information (UCI) block.

At step 535, the BS schedules the UE for a second data transmission and determines a second configuration for the second data transmission based on the updated first PHR report. When the first PHR report indicates that the UE has a large PHR available, the BS may assign a greater number of RBs, a high-order MCS for the second data transmission than the first data transmission. The BS may also configure the UE to use the OFDM waveform type. Conversely, when the first PHR report indicates that the UE has a small PHR available, the BS may assign less number of RBs, a lower-order MCS, and/or a DFT-s-OFDM waveform type for the second data transmission.

At step 540, the BS transmits the second UL configuration to the UE. At step 545, upon receiving the second UL configuration, the UE perform power control based on the second UL configuration using similar mechanisms as in the step 520. For example, the UE computes a second transmit power for the second data transmission based on the second UL configuration according to equation (1) and a second PHR based on the second transmit power according to equation (2).

At step 550, the UE transmits the second data transmission based on the second transmit power. At step 555, the UE transmits a second PHR report indicating the second PHR. The steps of 510-555 can be repeated to achieve closed-loop UL power control.

The processing latency for decoding the first UL configuration and computing the first transmit power and the first PHR may be substantial. When the method 500 is applied to low-latency subframes such as the subframes 210 and 220, there may not be a sufficient amount of time to accommodate the processing latency. For example, the BS may transmit the first UL configuration during the DL control portion 212 of the subframe 210 and the UE may be required to transmit the first data transmission and the first PHR report during the long UL burst portion 214 of the subframe 210. The processing latency may be substantially greater than the guard interval 218 between the DL control portion 212 and the long UL burst portion 214. Thus, it may be difficult for the UE to meet the timing requirement of low-latency subframes.

Figure 6:
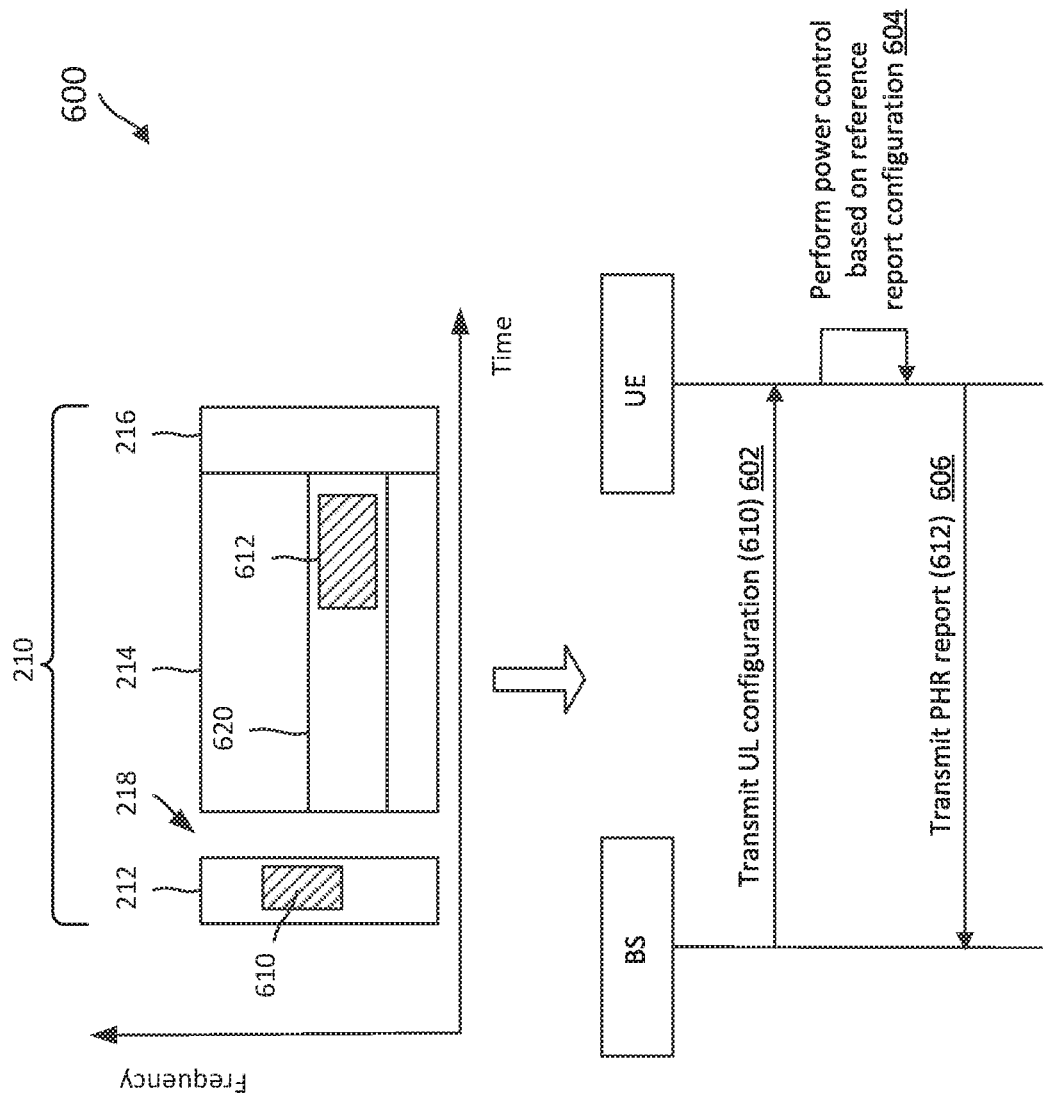
FIG. 6 illustrates a low-latency UL power control reporting according to some embodiments of the present disclosure.

FIG. 6 illustrates a low-latency UL power control reporting scheme 600 according to some embodiments of the present disclosure. The scheme 600 may be employed by a BS similar to the BS 105 and a UE similar to the UEs 115. The scheme 600 is suitable for use in low-latency subframes such as the subframes 210 and 220. The scheme 600 may use similar mechanisms as the method 500, but the UE reports PHR based on a reference PHR report configuration.

At step 602, the BS transmits a UL configuration 610 in the DL control portion 212 of a subframe 210. For example, the UL configuration 610 indicates a number of RBs, a MCS, and/or a waveform type assigned to the UE for transmission in the long UL burst portion 214 of the subframe 210.

At step 604, the UE computes a transmit power and a PHR based on the reference PHR report configuration, for example, according to equations (1) and (2), respectively. The reference PHR report configuration may indicate a predetermined number of RBs, a predetermined MCS, and a predetermined waveform type.

At step 606, the UE transmits a PHR report 612 indicating the PHR in a subband 620 during the long UL burst portion 214 of the subframe 210. For example, the UL configuration 610 indicates that he subband 620 is allocated to the UE. The subband 620 may include a number of RBs corresponding to the number of RBs indicated in the UL configuration 610. The UE may also transmit data in the subband 620 during the long UL burst portion 214 according to the UL configuration 610.

The reference report configuration may be predetermined and known by the BS and the UE. Thus, when the BS receives the PHR report 612, the BS may determine a next UL configuration based on the received PHR report 612 and the reference report configuration. Since the computation of the PHR is based on the reference report configuration instead of the UL configuration 610, the UE may compute the PHR before the decoding of the UL configuration 610 is completed. As such, the UE can meet the low-latency requirement of the subframe 210.

Figure 7:
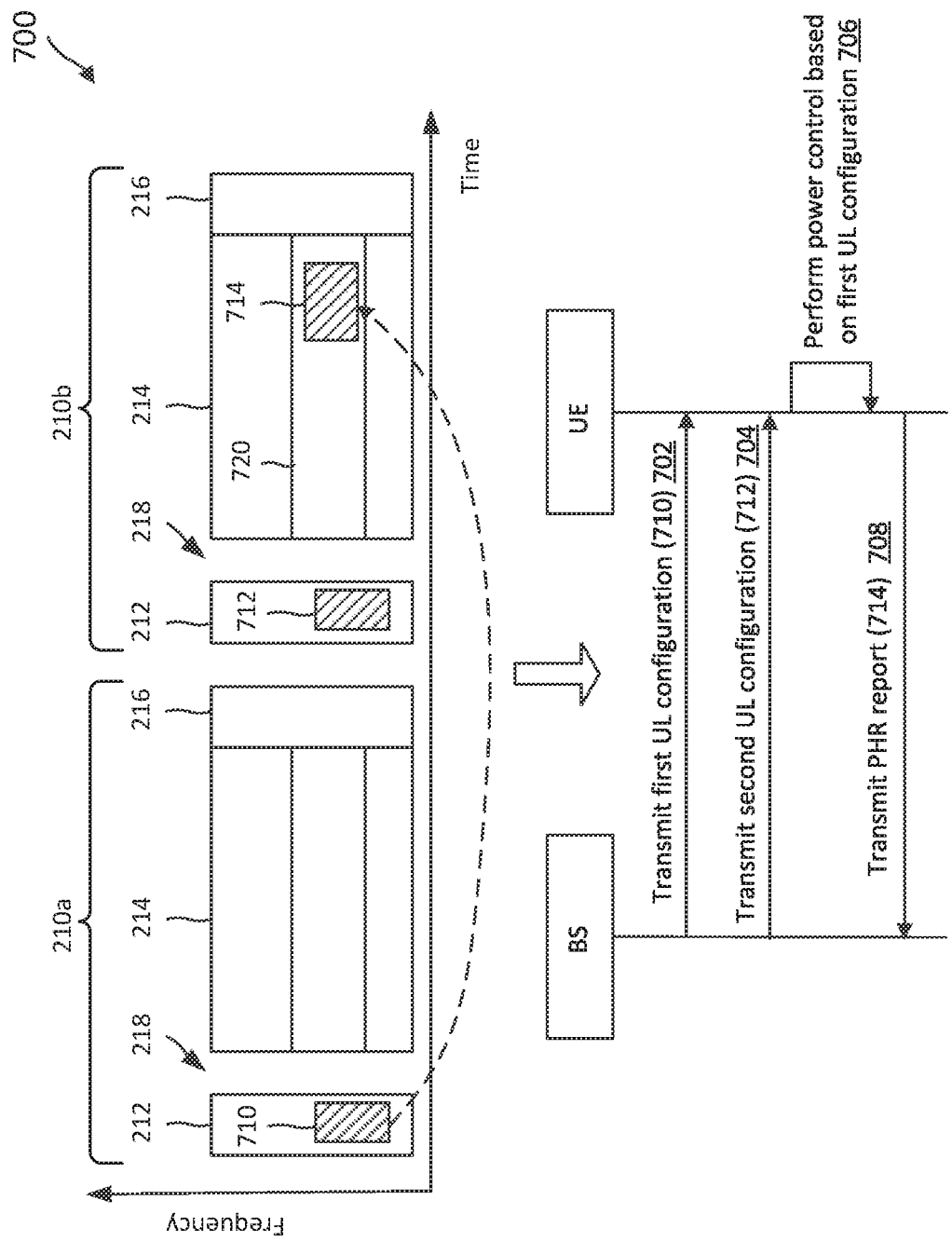
FIG. 7 illustrates a low-latency n UL power control reporting according to some embodiments of the present disclosure.

FIG. 7 illustrates a low-latency UL power control reporting scheme 700 according to some embodiments of the present disclosure. The scheme 700 may be employed a BS similar to the BS 105 and a UE similar to the UEs 115. The scheme 700 is suitable for use in low-latency subframes such as the subframes 210 and 220. The scheme 700 may use similar mechanisms as the method 500, but the UE reports delayed PHR. For example, the UE computes a PHR for a current subframe based on a UL configuration received in a previous subframe.

At step 702, the BS transmits a first UL configuration 710 in the DL control portion 212 of a first subframe 210a. The UL configuration 710 may be substantially similar to the UL configuration 610. For example, the UL configuration 710 indicates a number of RBs, a MCS, and/or a waveform type assigned to the UE for transmission in the long UL burst portion 214 of the first subframe 210a.

At step 704, the BS transmits a second UL configuration 712 in the DL control portion 212 of a second subframe 210b. The UL configuration 712 may be substantially similar to the UL configuration 710. For example, the UL configuration 712 indicates a number of RBs, a MCS, and/or a waveform type assigned to the UE for transmission in the long UL burst portion 214 of the second subframe 210b.

At step 706, the UE computes a transmit power and a PHR based on the first UL configuration 710 received in the previous first subframe 210a, for example, according to equations (1) and (2), respectively.

At step 708, the UE transmits a PHR report 714 indicating the PHR in a subband 720 during the long UL burst portion 214 of the second subframe 210b. For example, the UE is assigned to transmit in the subband 720 during the long UL burst portion 214 of the second subframe 210b. The UE may also transmit data in the subband 720 during the long UL burst portion 214 of the second subframe 210b.

The BS may adjust the next UL configuration or scheduling based on the PHR report 714 and the previous first UL configuration 710. Since the computation of the PHR is based on a previously received UL configuration (e.g., the UL configuration 710) as shown by the dashed arrow, the UE may compute the PHR before the decoding of the current second UL configuration 712 is completed. As such, the UE can meet the low-latency requirement of the subframe 210.

In an embodiment, the BS may schedule the UE to transmit in a short UL burst portion (e.g., the short UL burst portion 216) of a low-latency, self-contained subframe (e.g., the subframe 210). In such an embodiment, the UE can compute a PHR based on a UL configuration received in a DL control portion (e.g., the DL control portion 212) of the current subframe, for example, by employing the method 500.

Figure 8:
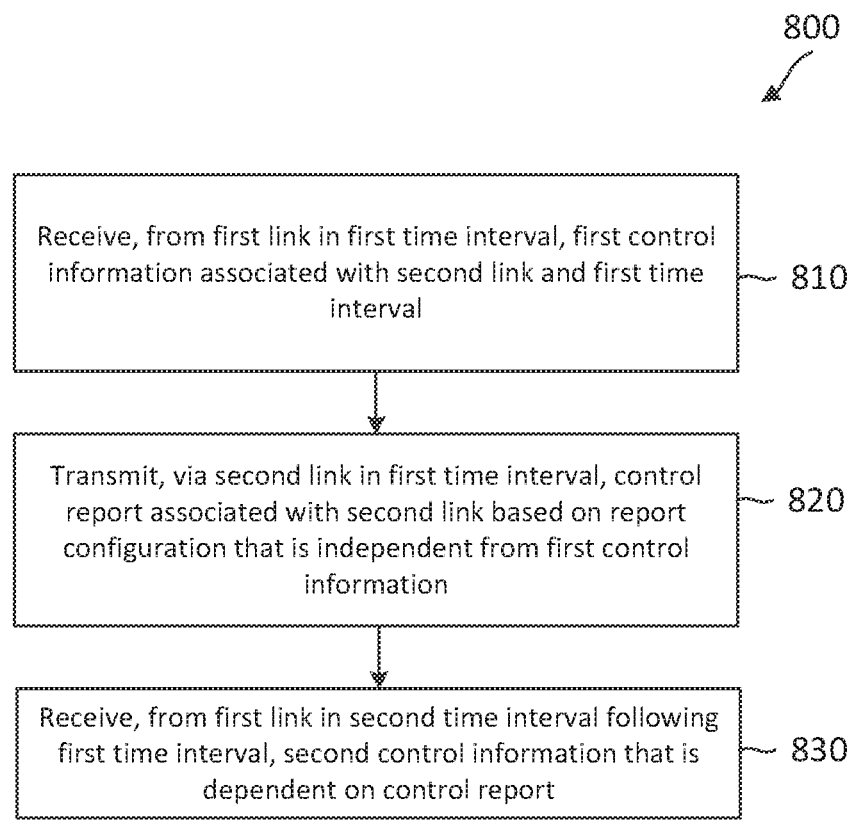
FIG. 8 is a flow diagram of a low-latency UL power control method according to some embodiments of the present disclosure.

FIG. 8 is a flow diagram of a low-latency UL power control method 800 according to some embodiments of the present disclosure. Steps of the method 800 can be executed by a computing device (e.g., a processor, processing circuit, and/or other suitable component) of a wireless communication device, such as the BSs 105 and the UEs 115. The method 800 may employ similar mechanisms as in the schemes 600 and 700 with respect to FIGS. 6 and 7, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes receiving, from a first link (e.g., in a DL direction) in a first time interval (e.g., the subframe 210), first control information (e.g., the UL configurations 610, 710, and 712) associated with a second link (e.g., in a UL direction) and the first time interval.

At step 820, the method 800 includes transmitting, via the second link in the first time interval, a control report (e.g., the PHR reports 612 and 714) associated with the second link based on the report configuration that is independent from the first control information. For instance, the report configuration is associated with a waveform type (e.g., OFDM or DFTs-OFDM) used by the wireless communication device for communication (e.g., in a UL direction).

At step 830, the method 800 includes receiving, from the first link in a second time interval (e.g., the subframe 210) following the first time interval, second control information (e.g., the UL configurations 610, 710, and 712) that is dependent on the control report.

In one embodiment, the report configuration indicates a reference PHR report configuration as described in the scheme 600. In another embodiment, the report configuration indicates a delayed PHR report configuration as described in the scheme 700. In such an embodiment, the PHR report may be generated based on control information (e.g., the UL configuration 710) received in a third time interval (e.g., the subframe 210a) prior to the first time interval (e.g., the subframe 210b).

Figure 9:
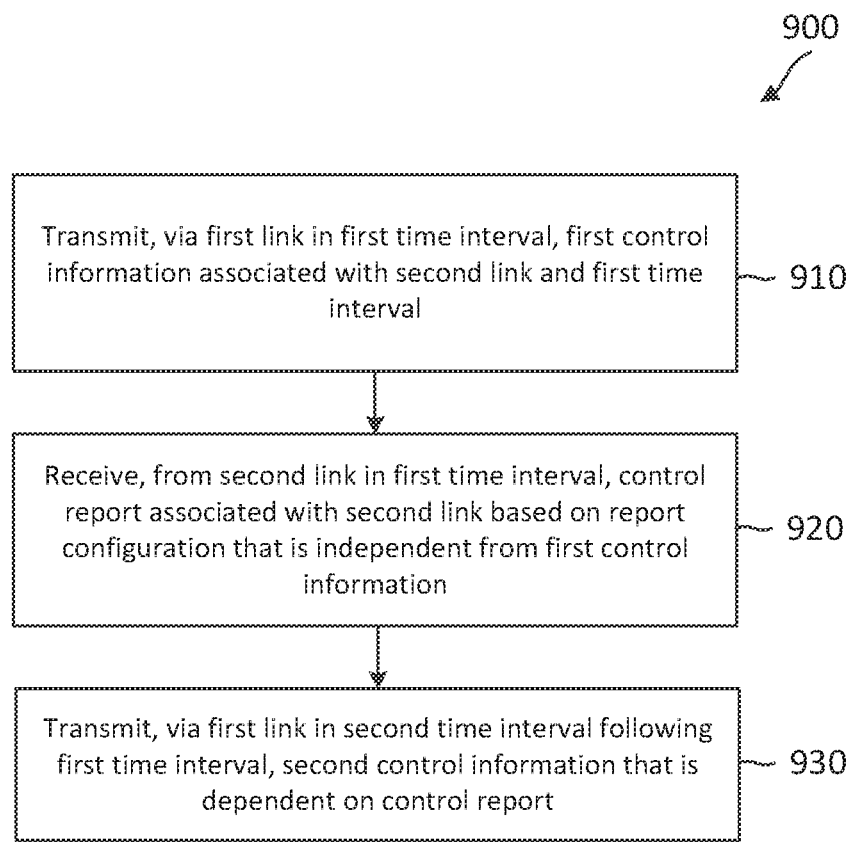
FIG. 9 is a flow diagram of a low-latency UL power control method according to some embodiments of the present disclosure.

FIG. 9 is a flow diagram of a low-latency UL power control method 900 according to some embodiments of the present disclosure. Steps of the method 900 can be executed by a computing device (e.g., a processor, processing circuit, and/or other suitable component) of a wireless communication device, such as the BSs 105 and the UEs 115. The method 900 may employ similar mechanisms as in the schemes 600 and 700 with respect to FIGS. 6 and 7, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes transmitting, via a first link (e.g., in a DL direction) in a first time interval (e.g., the subframe 210), first control information (e.g., the UL configurations 610, 710, and 712) associated with a second link (e.g., in a UL direction) and the first time interval.

At step 920, the method 900 includes receiving, from the second link in the first time interval, a control report (e.g., the PHR reports 612 and 714) associated with the second link based on the report configuration that is independent from the first control information. For instance, the report configuration is associated with a waveform type (e.g., OFDM or DFTs-OFDM) used by the wireless communication device for communication (e.g., in a UL direction).

At step 930, the method 900 includes transmitting, via the first link in a second time interval (e.g., the subframe 210) following first time interval, second control information (e.g., the UL configurations 610, 710, and 712) that is dependent on the control report.

In one embodiment, the report configuration indicates a reference PHR report configuration as described in the scheme 600. In such an embodiment, the second control information may be determined based on the reference PHR report configuration and the received control report.

In another embodiment, the report configuration indicates a delayed PHR report configuration as described in the scheme 700. In such an embodiment, the second control information may be determined based on control information (e.g., the UL configuration 712) transmitted in a third time interval (e.g., the subframe 210a) prior to the first time interval (e.g., the subframe 210b) and the received control report.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising receiving, by a wireless communication device from a first link in a first time interval, first control information associated with a second link and the first time interval; transmitting, by the wireless communication device via the second link in the first time interval, a control report associated with the second link based on a report configuration that is independent from the first control information; and receiving, by the wireless communication device from the first link in a second time interval following the first time interval, second control information that is dependent on the control report.

The method further includes wherein the report configuration includes a power headroom (PHR) report configuration. In some instances, the method further includes obtaining, by the wireless communication device, the report configuration including a power headroom (PHR) report configuration that is based on the waveform type. The method further includes wherein the control report indicates a transmit PHR of the wireless communication device. In some instances, the method further includes configuring, by the wireless communication device, the control report to indicate a transmit PHR of the wireless communication device. The method further include wherein the PHR report configuration includes a reference PHR report configuration. In some instances, the method further includes wherein the obtaining includes receiving the PHR report configuration indicating a reference PHR report configuration. The method further includes wherein the reference PHR report configuration indicates at least one of a predetermined number of resource blocks (RBs), a predetermined modulation coding scheme (MCS), or a predetermined waveform type, and wherein the method further comprises determining, by the wireless communication device, the transmit PHR based on the at least one of a predetermined number of RBs, a predetermined MCS, or a predetermined waveform type. The method further includes wherein the PHR report configuration includes a delayed PHR report configuration. In some instances, the method further includes wherein the obtaining includes receiving the PHR report configuration indicating a delayed PHR report configuration. The method further includes receiving, by the wireless communication device in a third time interval prior to the first time interval, third control information indicating at least one of a number of resource blocks (RBs), a modulation coding scheme (MCS), or a waveform type for a transmission in the third time interval; and determining, by the wireless communication device, the transmit PHR based on the at least one of a number of RBs, a MCS, or a waveform type for the transmission in the third time interval. The method further includes wherein the first control information indicates at least one of a resource allocation, a modulation coding scheme (MCS), or a waveform type for a transmission in the first time interval. In some instances, the method further includes receiving the first control information indicating at least one of a resource allocation, a modulation coding scheme (MCS), or a waveform type for a transmission in the first time interval.

Embodiments of the present disclosure include a method of wireless communication, comprising transmitting, by a wireless communication device via a first link in a first time interval, first control information associated with a second link and the first time interval; receiving, by the wireless communication device via the second link in the first time interval, a control report associated with the second link based on a report configuration that is independent from the first control information; and transmitting, by the wireless communication device via the first link in a second time interval following the first time interval, second control information that is dependent on the control report.

The method further includes wherein the report configuration includes a power headroom (PHR) report configuration. In some instances, the method further includes configuring, by the wireless communication device, the report configuration to include a power headroom (PHR) report configuration based on the waveform type. The method further includes wherein the control report indicates a transmit PHR of the wireless communication device. In some instances, the method further includes receiving the control report indicating a transmit PHR of the wireless communication device. The method further includes wherein the PHR report configuration includes a reference PHR report configuration. In some instances, the method further includes transmitting, by the wireless communication device, the PHR report configuration indicating a reference PHR report configuration. The method further includes wherein the reference PHR report configuration indicates at least one of a predetermined number of resource blocks (RBs), a predetermined modulation coding scheme (MCS), or a predetermined waveform type, and wherein the method further comprises determining, by the wireless communication device, the second control information based on at least the control report and the at least one of a predetermined number of RBs, a predetermined MCS, or a predetermined waveform type. The method further includes wherein the PHR report configuration includes a delayed PHR report configuration. The method further includes transmitting, by the wireless communication device in a third time interval prior to the first time interval, third control information indicating at least one of a number of resource blocks (RBs), a modulation coding scheme (MCS), or a waveform type for a transmission in the third time interval; and determining, by the wireless communication device, the second control information based on at least the control report and the at least one of a number of RBs, a MCS, or a waveform type for the transmission in the third time interval. The method further includes wherein the first control information indicates at least one of a resource allocation, a modulation coding scheme (MCS), or a waveform type for a transmission in the first time interval. In some instances, the method further includes configuring the first control information to indicate at least one of a resource allocation, a modulation coding scheme (MCS), or a waveform type for a transmission in the first time interval.

Embodiments of the present disclosure includes an apparatus comprising a transceiver configured to receive, from a first link in a first time interval, first control information associated with a second link and the first time interval; transmit, via the second link in the first time interval, a control report associated with the second link based on a report configuration that is independent from the first control information; and receive, from the first link in a second time interval following the first time interval, second control information that is dependent on the control report.

The apparatus further includes wherein the report configuration includes a power headroom (PHR) report configuration. The apparatus further includes wherein the control report indicates a transmit PHR of the apparatus. The apparatus further includes wherein the PHR report configuration includes a reference PHR report configuration. The apparatus further includes wherein the reference PHR report configuration indicates at least one of a predetermined number of resource blocks (RBs), a predetermined modulation coding scheme (MCS), or a predetermined waveform type, and wherein the transceiver is further configured to determine the transmit PHR based on the at least one of a predetermined number of RBs, a predetermined MCS, or a predetermined waveform type. The apparatus further includes wherein the PHR report configuration includes a delayed PHR report configuration. The apparatus further includes wherein the transceiver is further configured to receive, in a third time interval prior to the first time interval, third control information indicating at least one of a number of resource blocks (RBs), a modulation coding scheme (MCS), or a waveform type for a transmission in the third time interval, and wherein the apparatus further comprises a processor configured to determine the transmit PHR based on the at least one of a number of RBs, a MCS, or a waveform type for the transmission in the third time interval. The apparatus further includes wherein the first control information indicates at least one of a resource allocation, a modulation coding scheme (MCS), or a waveform type for a transmission in the first time interval.

Embodiments of the present disclosure includes an apparatus comprising a transceiver configured to transmit, via a first link in a first time interval, first control information associated with a second link and the first time interval; receive, via the second link in the first time interval, a control report associated with the second link based on a report configuration that is independent from the first control information; and transmit, via the first link in a second time interval following the first time interval, second control information that is dependent on the control report.

The apparatus further includes wherein the report configuration includes a power headroom (PHR) report configuration. The apparatus further includes wherein the control report indicates a transmit PHR of the apparatus. The apparatus further includes wherein the PHR report configuration includes a reference PHR report configuration. The apparatus further includes wherein the reference PHR report configuration indicates at least one of a predetermined number of resource blocks (RBs), a predetermined modulation coding scheme (MCS), or a predetermined waveform type, and wherein the apparatus further comprises a processor configured to determine the second control information based on at least the control report and the at least one of a predetermined number of RBs, a predetermined MCS, or a predetermined waveform type. The apparatus further includes wherein the PHR report configuration includes a delayed PHR report configuration. The apparatus further includes wherein the transceiver is further configured to transmit, in a third time interval prior to the first time interval, third control information indicating at least one of a number of resource blocks (RBs), a modulation coding scheme (MCS), or a waveform type for a transmission in the third time interval, and wherein the apparatus further comprises a processor configured to determine the second control information based on at least the control report and the at least one of a number of RBs, a MCS, or a waveform type for the transmission in the third time interval. The apparatus further includes wherein the first control information indicates at least one of a resource allocation, a modulation coding scheme (MCS), or a waveform type for a transmission in the first time interval.

Embodiments of the present disclosure include a computer-readable medium having program code recorded thereon, the program code comprising code for causing a wireless communication device to receive, from a first link in a first time interval, first control information associated with a second link and the first time interval; code for causing the wireless communication device to transmit, via the second link in the first time interval, a control report associated with the second link based on a report configuration that is independent from the first control information; and code for causing the wireless communication device to receive, from the first link in a second time interval following the first time interval, second control information that is dependent on the control report.

The computer-readable medium further includes wherein the report configuration includes a power headroom (PHR) report configuration. The computer-readable medium further includes wherein the control report indicates a transmit PHR of the wireless communication device. The computer-readable medium further includes wherein the PHR report configuration includes a reference PHR report configuration. The computer-readable medium further includes wherein the reference PHR report configuration indicates at least one of a predetermined number of resource blocks (RBs), a predetermined modulation coding scheme (MCS), or a predetermined waveform type, and wherein the program code further comprises code for causing the wireless communication device to determine the transmit PHR based on the at least one of a predetermined number of RBs, a predetermined MCS, or a predetermined waveform type. The computer-readable medium further includes wherein the PHR report configuration includes a delayed PHR report configuration. The computer-readable medium further includes code for causing the wireless communication device to receive, in a third time interval prior to the first time interval, third control information indicating at least one of a number of resource blocks (RBs), a modulation coding scheme (MCS), or a waveform type for a transmission in the third time interval; and code for causing the wireless communication device to determine the transmit PHR based on the at least one of a number of RBs, a MCS, or a waveform type for the transmission in the third time interval. The computer-readable medium further includes wherein the first control information indicates at least one of a resource allocation, a modulation coding scheme (MCS), or a waveform type for a transmission in the first time interval.

Embodiments of the present disclosure include a computer-readable medium having program code recorded thereon, the program code comprising code for causing a wireless communication device to transmit, via a first link in a first time interval, first control information associated with a second link and the first time interval; code for causing the wireless communication device to receive, via the second link in the first time interval, a control report associated with the second link based on a report configuration that is independent from the first control information; and code for causing the wireless communication device to transmit, via the first link in a second time interval following the first time interval, second control information that is dependent on the control report.

The computer-readable medium further includes wherein the report configuration includes a power headroom (PHR) report configuration. The computer-readable medium further includes wherein the control report indicates a transmit PHR of the wireless communication device. The computer-readable medium further includes wherein the PHR report configuration includes a reference PHR report configuration. The computer-readable medium further includes wherein the reference PHR report configuration indicates at least one of a predetermined number of resource blocks (RBs), a predetermined modulation coding scheme (MCS), or a predetermined waveform type, and wherein the program code further comprises code for causing the wireless communication device to determine the second control information based on at least the control report and the at least one of a predetermined number of RBs, a predetermined MCS, or a predetermined waveform type. The computer-readable medium further includes wherein the PHR report configuration includes a delayed PHR report configuration. The computer-readable medium further includes code for causing the wireless communication device to transmit, in a third time interval prior to the first time interval, third control information indicating at least one of a number of resource blocks (RBs), a modulation coding scheme (MCS), or a waveform type for a transmission in the third time interval; and code for causing the wireless communication device to determine the second control information based on at least the control report and the at least one of a number of RBs, a MCS, or a waveform type for the transmission in the third time interval. The computer-readable medium further includes wherein the first control information indicates at least one of a resource allocation, a modulation coding scheme (MCS), or a waveform type for a transmission in the first time interval.

Embodiments of the present disclosure include an apparatus comprising means (e.g., the transceiver 310 and the antennas 316) for receiving, from a first link in a first time interval, first control information associated with a second link and the first time interval; means (e.g., the transceiver 310 and the antennas 316) for transmitting, via the second link in the first time interval, a control report associated with the second link based on a report configuration that is independent from the first control information; and means (e.g., the transceiver 310 and the antennas 316) for receiving, from the first link in a second time interval following the first time interval, second control information that is dependent on the control report.

The apparatus further includes wherein the report configuration includes a power headroom (PHR) report configuration. The apparatus further includes wherein the control report indicates a transmit PHR of the apparatus. The apparatus further includes wherein the PHR report configuration includes a reference PHR report configuration. The apparatus further includes wherein the reference PHR report configuration indicates at least one of a predetermined number of resource blocks (RBs), a predetermined modulation coding scheme (MCS), or a predetermined waveform type, and wherein the apparatus further comprises means (e.g., the control information an report processing module 308) for determining the transmit PHR based on the at least one of a predetermined number of RBs, a predetermined MCS, or a predetermined waveform type. The apparatus further includes wherein the PHR report configuration includes a delayed PHR report configuration. The apparatus further includes means (e.g., the transceiver 310 and the antennas 316) for receiving, in a third time interval prior to the first time interval, third control information indicating at least one of a number of resource blocks (RBs), a modulation coding scheme (MCS), or a waveform type for a transmission in the third time interval, and wherein the apparatus further comprises means (e.g., the control information an report processing module 308) for determining the transmit PHR based on the at least one of a number of RBs, a MCS, or a waveform type for the transmission in the third time interval. The apparatus further includes wherein the first control information indicates at least one of a resource allocation, a modulation coding scheme (MCS), or a waveform type for a transmission in the first time interval.

Embodiments of the present disclosure include an apparatus comprising means (e.g., the transceiver 410 and the antennas 416) for transmitting, via a first link in a first time interval, first control information associated with a second link and the first time interval; means (e.g., the transceiver 410 and the antennas 416) for receiving, via the second link in the first time interval, a control report associated with the second link based on a report configuration that is independent from the first control information; and means (e.g., the transceiver 410 and the antennas 416) for transmitting, via the first link in a second time interval following the first time interval, second control information that is dependent on the control report.

The apparatus further includes wherein the report configuration includes a power headroom (PHR) report configuration. The apparatus further includes wherein the control report indicates a transmit PHR of the apparatus. The apparatus further includes wherein the PHR report configuration includes a reference PHR report configuration. The apparatus further includes wherein the reference PHR report configuration indicates at least one of a predetermined number of resource blocks (RBs), a predetermined modulation coding scheme (MCS), or a predetermined waveform type, and wherein the apparatus further comprises means (e.g., the control information an report processing module 408) for determining the second control information based on at least the control report and the at least one of a predetermined number of RBs, a predetermined MCS, or a predetermined waveform type. The apparatus further includes wherein the PHR report configuration includes a delayed PHR report configuration. The apparatus further includes means (e.g., the transceiver 310 and the antennas 316) for transmitting, in a third time interval prior to the first time interval, third control information indicating at least one of a number of resource blocks (RBs), a modulation coding scheme (MCS), or a waveform type for a transmission in the third time interval; and means (e.g., the control information an report processing module 408) for determining the second control information based on at least the control report and the at least one of a number of RBs, a MCS, or a waveform type for the transmission in the third time interval. The apparatus further includes wherein the first control information indicates at least one of a resource allocation, a modulation coding scheme (MCS), or a waveform type for a transmission in the first time interval.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) from a base station (BS), first scheduling information for a first time interval;
receiving, by the UE from the BS, second scheduling information for a second time interval, the second time interval being after the first time interval;
transmitting, by the UE to the BS during the second time interval in response to the second scheduling information, a power headroom (PHR) report based on the first scheduling information for the first time interval; and
receiving, by the UE from the BS, third scheduling information for a third time interval, the third time interval being after the second time interval, the third scheduling information being based on the PHR report.

2. The method of claim 1, wherein the receiving the first scheduling information includes:
receiving, by the UE from the BS, the first scheduling information indicating a combination of a modulation coding scheme (MCS) and a number of resource blocks (RBs) assigned to the UE for a transmission in the first time interval.

3. The method of claim 2, wherein the transmitting the PHR report includes:
transmitting, by the UE to the BS, the PHR report indicating a transmit PHR based on the combination of the MCS and the number of RBs.

4. The method of claim 3, further comprising:
determining, by the UE, the transmit PHR based on the combination of the MCS and the number of RBs.

5. The method of claim 2, wherein:
the receiving the first scheduling information includes:
receiving, by the UE from the BS, the first scheduling information indicating the MCS and the number of RBs; and
the transmitting the PHR report includes:
transmitting, by the UE to the BS, the transmit PHR report indicating a transmit PHR based on the MCS and the number of RBs.

6. The method of claim 1, further comprising:
receiving, by the UE from the BS, a delayed PHR configuration indicating to delay the transmitting the PHR report from the first time interval to the second time interval,
wherein the transmitting the PHR report is further based on the delayed PHR configuration.

7. A method of wireless communication, comprising:
transmitting, by a base station (BS) to a user equipment (UE), first scheduling information for a first time interval;
transmitting, by the BS to the UE, second scheduling information for a second time interval, the second time interval being after the first time interval;
receiving, by the BS from the UE during the second time interval in response to the second scheduling information, a power headroom (PHR) report based on the first scheduling information for the first time interval; and
transmitting, by the BS to the UE, third scheduling information for a third time interval, the third time interval being after the second time interval, the third scheduling information being based on the PHR report.

8. The method of claim 7, wherein the transmitting the first scheduling information includes:
transmitting, by the BS to the UE, the first scheduling information indicating a combination of a modulation coding scheme (MCS) and a number of resource blocks (RBs) assigned to the UE for a transmission in the first time interval.

9. The method of claim 8, wherein the receiving the PHR report includes:

receiving, by the BS from the UE, the PHR report indicating a transmit PHR based on the combination of the MCS and the number of RBs.

10. The method of claim 9, further comprising:
determining, by the BS, the third scheduling information based on the transmit PHR.

11. The method of claim 8, wherein:
the transmitting the first scheduling information includes:
transmitting, by the BS to the UE, the first scheduling information indicating the MCS and the number of RBs; and
the receiving the PHR report includes:
receiving, by the BS from the UE, the PHR report indicating a transmit PHR based on the MCS and the number of RBs.

12. The method of claim 7, further comprising:
transmitting, by the BS to the UE, a delayed PHR configuration indicating to delay the transmitting the PHR report from the first time interval to the second time interval,
wherein the receiving the PHR report is further based on the delayed PHR configuration.

13. A user equipment (UE) comprising:
a transceiver configured to:
receive, from a base station (BS), first scheduling information for a first time interval;
receive, from the BS, second scheduling information for a second time interval after the first time interval;
transmit, to the BS during the second time interval in response to the second scheduling information, a power headroom (PHR) report based on the first scheduling information for the first time interval; and
receive, from the BS, third scheduling information for a third time interval after the second time interval, the third scheduling information based on the PHR report.

14. The UE of claim 13, wherein the first scheduling information indicates a combination of a modulation coding scheme (MCS) and a number of resource blocks (RBs) assigned to the UE for a transmission in the first time interval.

15. The UE of claim 14, wherein the PHR report indicates a transmit PHR based on the combination of the MCS and the number of RBs.

16. The UE of claim 15, further comprising:
a processor configured to determine the transmit PHR based on the combination of the MCS and the number of RBs.

17. A base station (BS) comprising:
a transceiver configured to:
transmit, to a user equipment (UE), first scheduling information for a first time interval;
transmit, to the UE, second scheduling information for a second time interval after the first time interval;
receive, from the UE during the second time interval in response to the second scheduling information, a power headroom (PHR) report based on the first scheduling information for the first time interval; and
transmit, to the UE, third scheduling information for a third time interval after the second time interval, the third scheduling information based on the PHR report.

18. The BS of claim 17, wherein the first scheduling information indicates a combination of a modulation coding scheme (MCS) and a number of resource blocks (RBs) assigned to the UE for a transmission in the first time interval.

19. The BS of claim 18, wherein the PHR report indicate a transmit PHR based on the combination of the MCS and the number of RBs.

20. The BS of claim 19, further comprising:
a processor configured to determine the third scheduling information based on the transmit PHR.

* * * * *